(12) United States Patent
Ngo et al.

(10) Patent No.: US 12,619,872 B2
(45) Date of Patent: May 5, 2026

(54) SYSTEM AND METHOD FOR FILTERING DATASETS USING CONDITIONAL-LIKELIHOOD FILTRATION

(71) Applicant: Cohere Inc., Toronto (CA)

(72) Inventors: Helen Ngo, Toronto (CA); Nicholas Frosst, Toronto (CA)

(73) Assignee: Cohere Inc., Toronto (CA)

( * ) Notice: Subject to any disclaimer, the term of this patent is extended or adjusted under 35 U.S.C. 154(b) by 404 days.

(21) Appl. No.: 17/808,242

(22) Filed: Jun. 22, 2022

(65) Prior Publication Data

US 2022/0414467 A1 Dec. 29, 2022

Related U.S. Application Data

(60) Provisional application No. 63/202,785, filed on Jun. 24, 2021.

(51) Int. Cl.
*G06N 3/08* (2023.01)
*G06F 40/289* (2020.01)
*G06F 40/40* (2020.01)

(52) U.S. Cl.
CPC ............. *G06N 3/08* (2013.01); *G06F 40/289* (2020.01); *G06F 40/40* (2020.01)

(58) Field of Classification Search
CPC ........... G06N 3/08; G06N 3/09; G06N 3/045; G06N 3/0475; G06F 40/289; G06F 40/40; G06F 40/30
See application file for complete search history.

(56) References Cited

U.S. PATENT DOCUMENTS

| | | | | |
|---|---|---|---|---|
| 10,885,279 B2 * | 1/2021 | Barachha | .............. | G06F 40/268 |
| 2015/0163184 A1 * | 6/2015 | Kanter | .................... | H04L 51/52 |
| | | | | 709/204 |
| 2016/0336006 A1 * | 11/2016 | Levit | ..................... | G10L 15/063 |
| 2020/0125928 A1 * | 4/2020 | Doyle | ...................... | G06N 3/08 |
| 2021/0097405 A1 | 4/2021 | McNeil et al. | | |

(Continued)

OTHER PUBLICATIONS

Combined Search Report issued in related GB application No. 2209258.9, dated Apr. 8, 2024.

(Continued)

*Primary Examiner* — Bhavesh M Mehta
*Assistant Examiner* — Jangwoen Lee
(74) *Attorney, Agent, or Firm* — CPST Intellectual Property Inc.; Brett J. Slaney

(57) ABSTRACT

A system and method are provided for generating a trained model to filter data sets for filtering hate speech. The method includes obtaining an unfiltered corpus of data, obtaining a set of trigger phrases, and using the set of trigger phrases to generate a trained model which comprises at least one conditional likelihood of the trigger phrases conditioned on documents in the corpus of data. A system and method are also provided for filtering data sets for hate speech using pre-trained models. The method includes obtaining a pre-trained model generated using a set of trigger phrases and which comprises at least one conditional likelihood of the trigger phrases conditioned on document in a corpus of data used to generate the pretrained model; using the pretrained model to filter an unfiltered dataset and generate a filtered dataset; and outputting the filtered dataset.

20 Claims, 9 Drawing Sheets

(56) References Cited

U.S. PATENT DOCUMENTS

| | | | |
|---|---|---|---|
| 2022/0229991 A1* | 7/2022 | Duong | G06F 40/289 |
| 2022/0253447 A1* | 8/2022 | Boytsov | G06F 16/319 |
| 2022/0284884 A1* | 9/2022 | Tongya | G06F 40/35 |

OTHER PUBLICATIONS

Vidgen B; Derczynski, L.; Directions in abusive language training data, a systematic review: Garbage in, garbage out. PLOS ONE 15(12): e0243300; https://doi.org/10.1371/journal.pone.0243300 (2020).

Raffel, Colin; Shazeer, Noam; Roberts, Adam; Narang, Katherine Lee, Sharan; Matena, Michael; Zhou, Yanqi; Li, Wei; and Liu, Peter J.; Exploring the limits of transfer learning with a unified text-totext transformer. Journal of Machine Learning Research, 2020; 21(140):1-67; https://doi.org/10.48550/arXiv.1910.10683 (Jul. 28, 2020).

Dodge, Jesse; Sap, Maarten, Marasovic, Ana; Agnew, William; Ilharco, Gabriel; Groeneveld, Dirk; Gardner, Matt; Documenting the English Colossal Clean Crawled Corpus; https://doi.org/10.48550/arXiv.2104.08758; (Apr. 18, 2021).

Einstein, Albert; Zur Elektrodynamik bewegter Korper. (German) [On the electrodynamics of moving bodies]. Annalen der Physik, 322(10):891-921, 1905; Translation: http://hermes.ffn.ub.es/luisnavarro/nuevo_maletin/Einstein_1905_relativity.pdf.

Kennedy, B., Atari, M., Davani, A. M., Yeh, L., Omrani, A., Kim, Y.; Dehghani, M.; The Gab Hate Corpus: A collection of 27k posts annotated for hate speech. (Jul. 18, 2018) https://doi.org/10.31234/osf.io/hqixn (Jul. 18, 2018).

Gehman, Sam; Gururangan, Suchin; Sap, Maarten; Choi, Yejin & Smith, Noah A.; RealToxicityPrompts: Evaluating Neural Toxic Degeneration in Language Models. Findings of EMNLP; https://doi.org/10.48550/arXiv.2009.11462 (2020).

Dodge, Jesse et al.; Documenting the English Colossal Clean Crawled Corpus. https://arxiv.org/abs/2104.08758 (Apr. 18, 2021).

Hookr, Sara; https://twitter.com/sarahookr/status/1361373527861915648 (Feb. 15, 2021).

* cited by examiner llh_unfiltered
llh_blocklist
llh_10kfinetune
llh_20kfinetune
llh_30kfinetune
llh_scratch Average Likelihood Per Axis identity_attack
threat
severe_toxicity
sexually_explicit
profanity
toxicity
flirtation
insult Axis

0
-50
-100
-150
-200
-250
-300

Likelihood

SYSTEM AND METHOD FOR FILTERING DATASETS USING CONDITIONAL-LIKELIHOOD FILTRATION

CROSS-REFERENCE TO RELATED APPLICATIONS

This application claims priority to United States Provisional Patent Application No. 63/202,785 filed on Jun. 24, 2021, and the entire contents of which is incorporated herein by reference.

TECHNICAL FIELD

The following generally relates generally to filtering datasets, specifically to filtering such datasets using conditional-likelihood filtration, for example to filter hate speech.

BACKGROUND

Large pretrained neural language models pretrained on datasets scraped from the open web are responsible for many recent advancements in natural language processing (NLP) and have seen rapid adoption in real world applications. While this has enabled the development of new and impactful technology (e.g., translation), concerns have been raised that these models reflect and amplify the systemic bias and prejudice present in their training corpuses. Such language models are normally trained on data scraped from the open web, including text that covers a wide variety of modern discourse. Some of the perspectives represented in this discourse propagate harmful and oppressive views, such as racism, sexism, ableism, nationalism, etc. Moreover, some webpages include text which is otherwise harmful, toxic, abusive, obscene, or profane. Language models trained on a variety of internet corpuses have been compared, observing that models trained on Wikipedia, for example, exhibit lower expected maximum toxicity, suggesting that models acquire toxicity from their pretraining data.

The resulting models may generate harmful text when prompted with innocuous prompts and have the potential to cause real world harm to end users. The size of these datasets makes human evaluation and filtration impractical if not impossible, as it would take many human lifetimes just to read the datasets in their entirety.

One approach to this issue has been to employ word level blocklists. When creating a dataset of text, one can remove documents in the dataset if they contain a word on the blocklist. This is a simple way to remove documents with obvious hateful text, such as racial slurs, but may potentially miss hateful documents that do not use those words, as well as erroneously flag non-hateful documents which use the words in an academic, rhetorical, or expository context. For example, a word-level blocklist could flag academic discussions of racism for removal.

Another approach is vocabulary shifting, which is a technique which learns a 2-dimensional representation of toxicity and non-toxicity for every token in a vocabulary, which is then used to boost the likelihood of non-toxic tokens. This suffers from the same problem as word-level blocklists, where tokens are assigned negative connotations regardless of their context.

Self-debiasing mitigates corpus-based bias in language models at generation time by using the learned knowledge of a pretrained language model to identify biases in text with a zero-shot prompt-based approach.

It is an object of the following to address at least one of the above-noted disadvantages.

SUMMARY

To address the shortcomings of word-level filtration and the need for large-scale language models that are not likely to generate harmful text, a new method for removing documents from the training data is proposed. A language model is used, which has been trained on an unfiltered corpus to compute the conditional likelihood of a trigger phrases conditioned on each document in the corpus, where a trigger phrase is a succinct statement of biased or hateful rhetoric. The computed likelihoods can then be used to filter the dataset, removing documents which were shown to increase the likelihood of these trigger phrases.

It has been demonstrated that models trained on this filtered dataset are less likely to generate hateful text by measuring the relative likelihoods on examples from the RealToxicityPrompts database, while preserving performance on standard language modeling benchmarks. The methods described herein can be adapted iteratively over time to capture new forms of harm. The generalizability of the proposed methodology allows for the methodology to be run iteratively with new triggers.

The following describes a method to enable researchers to programmatically and efficiently remove large volumes of harmful text by using the learned knowledge of a pretrained language model. The following also describes a verification of such a method through a human-labelled dataset of harmful text, and experiments which demonstrate that fine-tuning models on the resulting filtered dataset are less likely to generate harmful text. The following also provides an analysis highlighting problematic examples in existing standard language modeling benchmarks and the need for researchers creating evaluation benchmarks to identify harmful data in their benchmarks.

In one aspect, there is provided a method of generating a trained model to filter data sets for filtering hate speech, the method comprising: obtaining an unfiltered corpus of data; obtaining a set of trigger phrases; and using the set of trigger phrases to generate a trained model which comprises at least one conditional likelihood of the trigger phrases conditioned on documents in the corpus of data.

In another aspect, there is provided a method of filtering data sets for hate speech using pre-trained models, the method comprising: obtaining a pretrained model generated using a set of trigger phrases and which comprises at least one conditional likelihood of the trigger phrases conditioned on document in a corpus of data used to generate the pretrained model; using the pretrained model to filter an unfiltered dataset and generate a filtered dataset; and outputting the filtered dataset.

BRIEF DESCRIPTION OF THE DRAWINGS

Embodiments will now be described with reference to the appended drawings wherein.

3

Figure 3A:
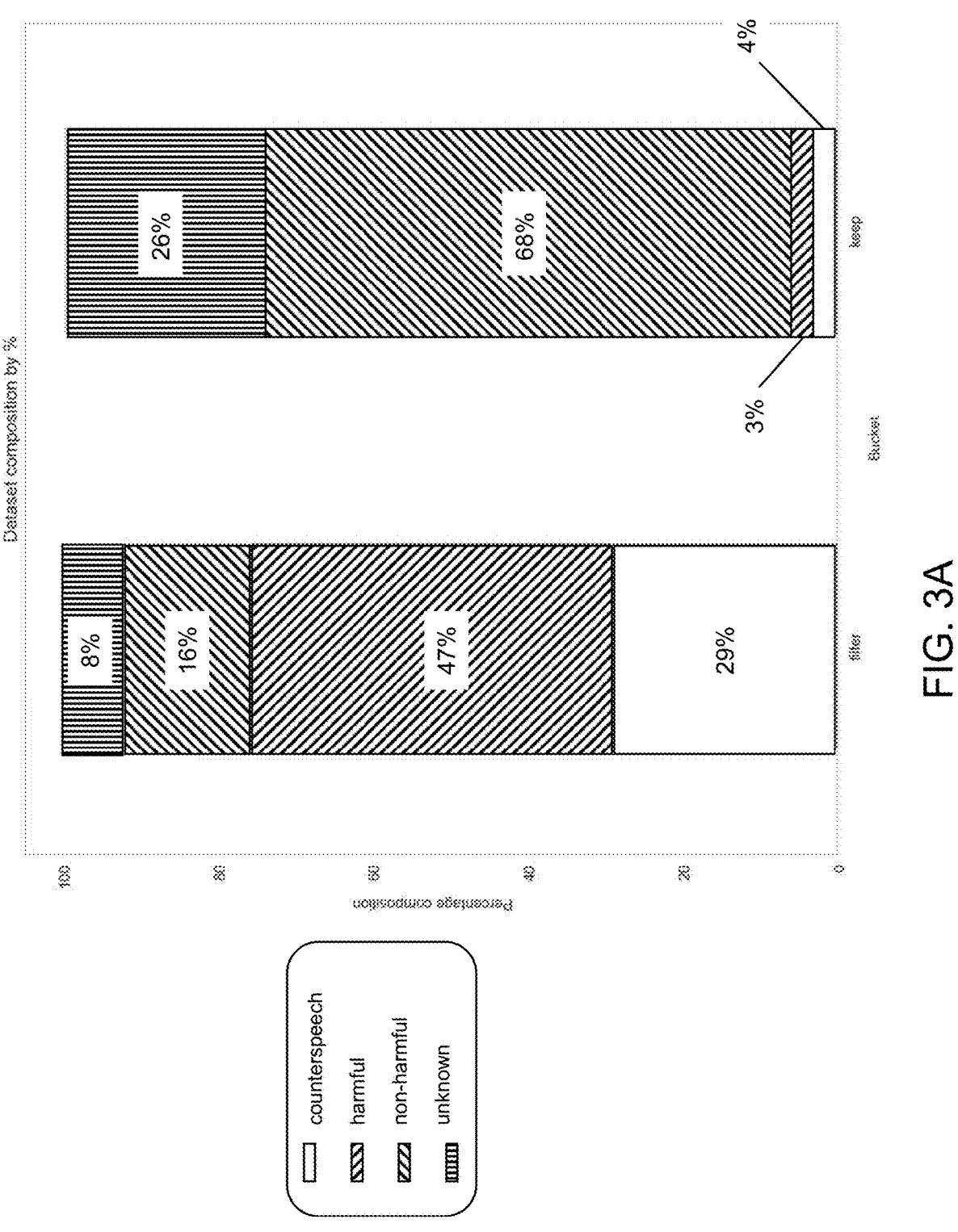
Figure 3B:
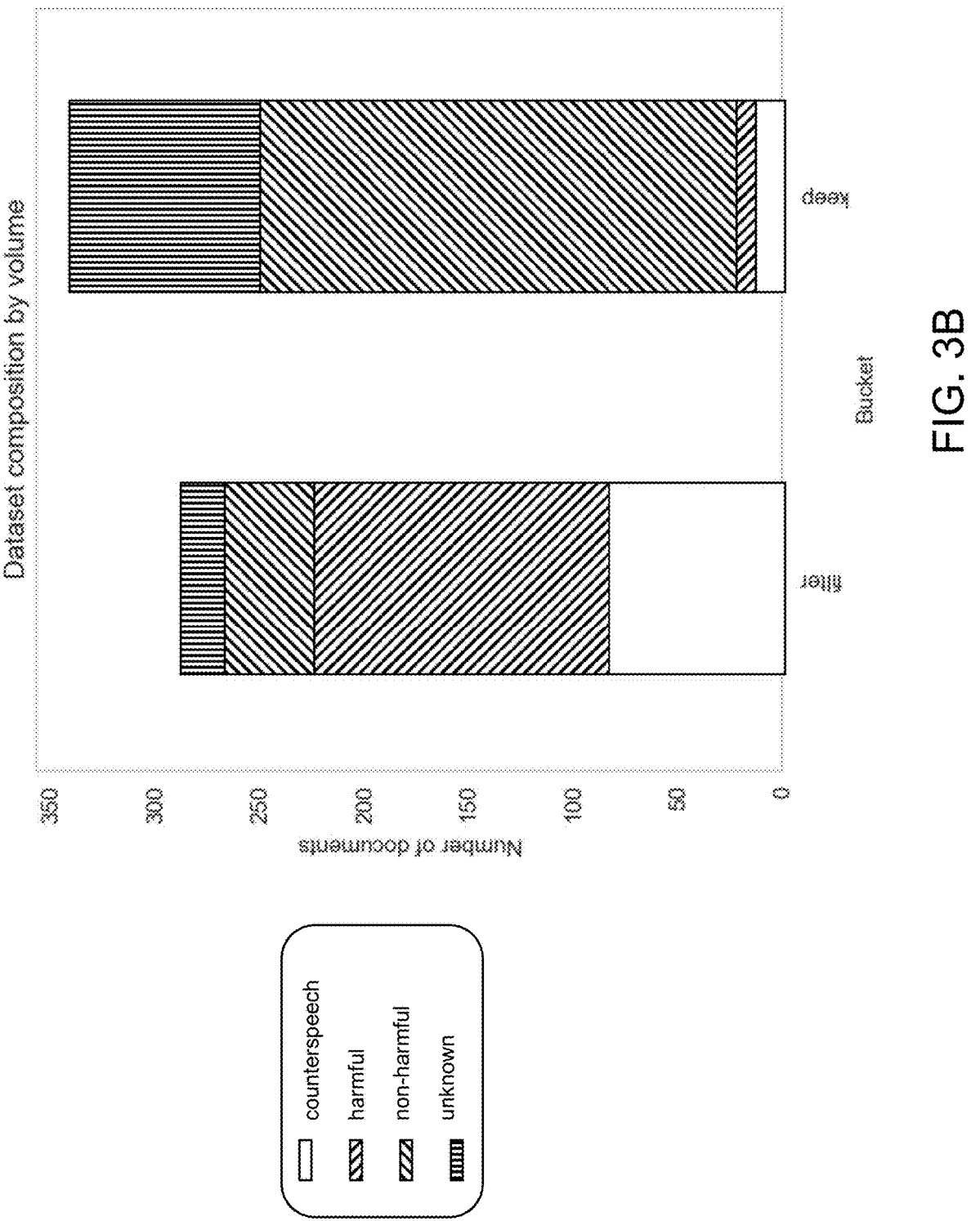

FIGS. 3A and 3B are charts comparing data to be filtered versus the rest of a dataset.

Figures 4, 5:
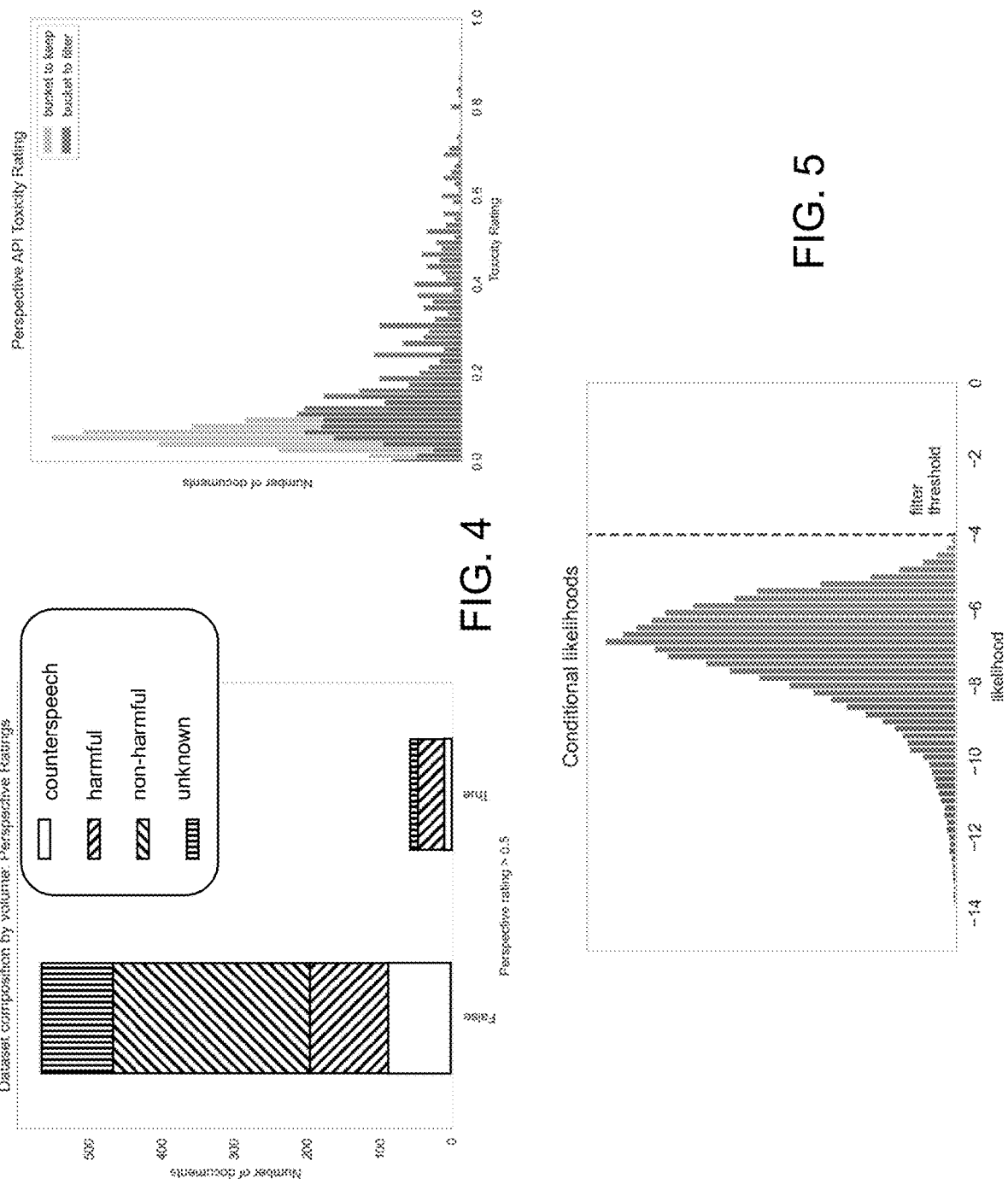

FIG. 4 illustrates filtration by PERSPECTIVE API for a toxicity rating of >0.5.

FIG. 5 illustrates a filter threshold to illustrate how thresholds can be selected to maximize the amount of harmful data filtered out while retaining the remaining data.

Figure 6:
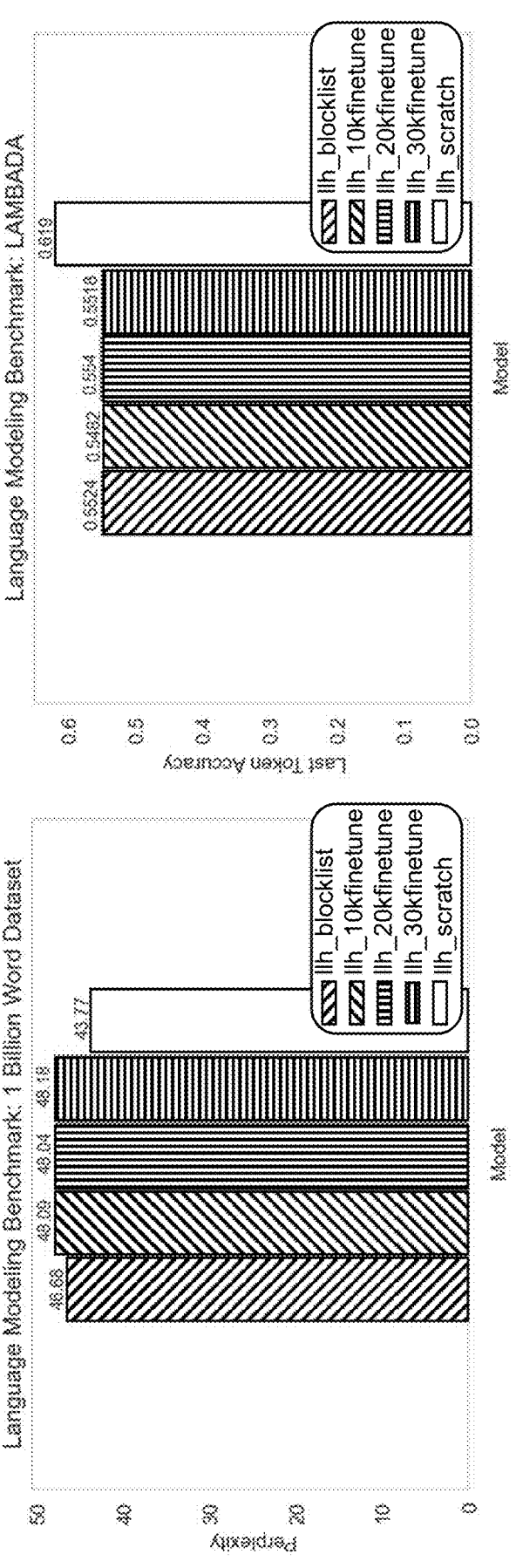

FIG. 6 illustrates language modeling benchmark results.

Figure 7:
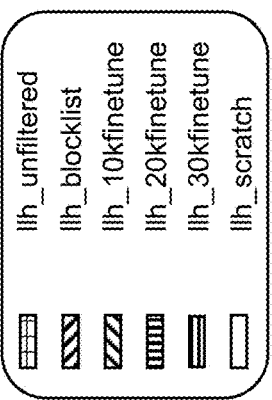

FIG. 7 illustrates average likelihood per axis for a number of axes.

Figure 8:
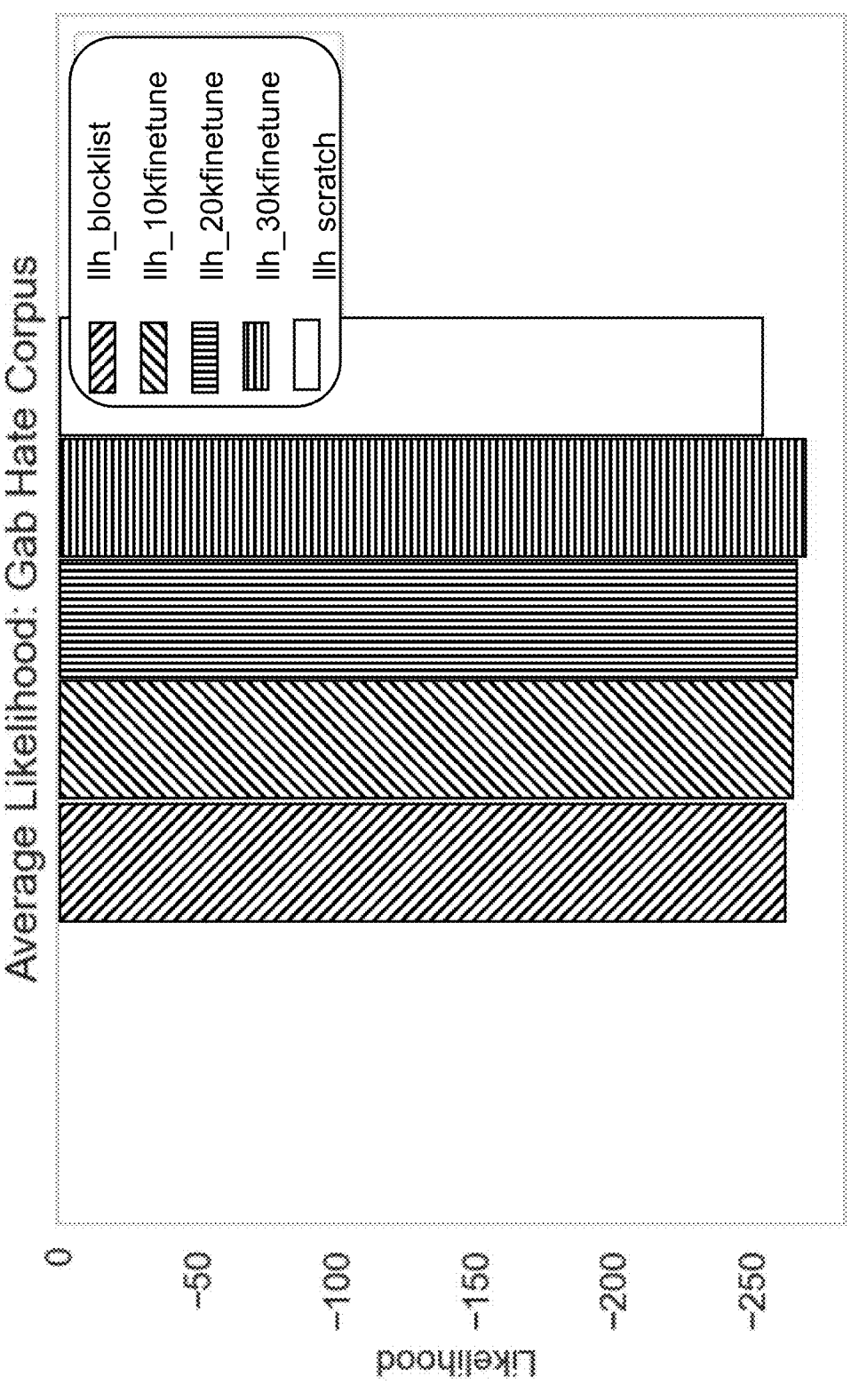

FIG. 8 illustrates results on the Gab Hate Corpus.

DETAILED DESCRIPTION

The ever-increasing scale of architectures and datasets used to train neural language models have recently allowed practitioners to build new applications such as code generation, longform creative writing, and dialogue generation. Language models trained on datasets curated from the open web encode systemic biases, problematic priors, prejudices and harmful views from their training data, which they subsequently propagate to end users.

The following describes a system that programmatically identifies and removes harmful text content from web-scale datasets to mitigate potential harm caused by language models trained on the open web. A pretrained language model can be used to assess the likelihood of trigger phrases conditioned on a document from a corpus and use this likelihood metric to identify a threshold used to filter out text from the dataset. A method is described herein for filtering documents from the training data. Using a language model trained on an unfiltered corpus the conditional likelihood of a human-written trigger phrase appended to each document in the corpus is computed. A trigger phrase is defined as a succinct statement of biased or hateful rhetoric, such as, "Working class citizens are getting their jobs taken away by illegal immigrants." These computed likelihoods are used to filter the dataset removing documents which were shown to increase the likelihood of these trigger phrases.

It has been demonstrated that training on this dataset reduces the propensity for the model to generate harmful text by measuring its relative likelihoods on labeled examples from the RealToxicityPrompts dataset and the Gab Hate Corpus. When compared to standard keyword-based filtration the presently described method can result in more nuanced filtration. Since it is infeasible to fully remove all harmful content from web-scale datasets and harmful language on the internet is constantly evolving, methods need to be adapted iteratively over time to capture new forms of harm. The generalizability of the present methodology allows for it to be run iteratively with new triggers. That is, the described approach applied to filter a dataset based on one axis of prejudice (e.g., racism) can also result in improvements in several other forms of prejudice (e.g., sexism). Likelihood-based filtration can be used in conjunction with a narrower blocklist to minimize harmful content in the corpus while retaining expository context and counter speech.

Figure 1:
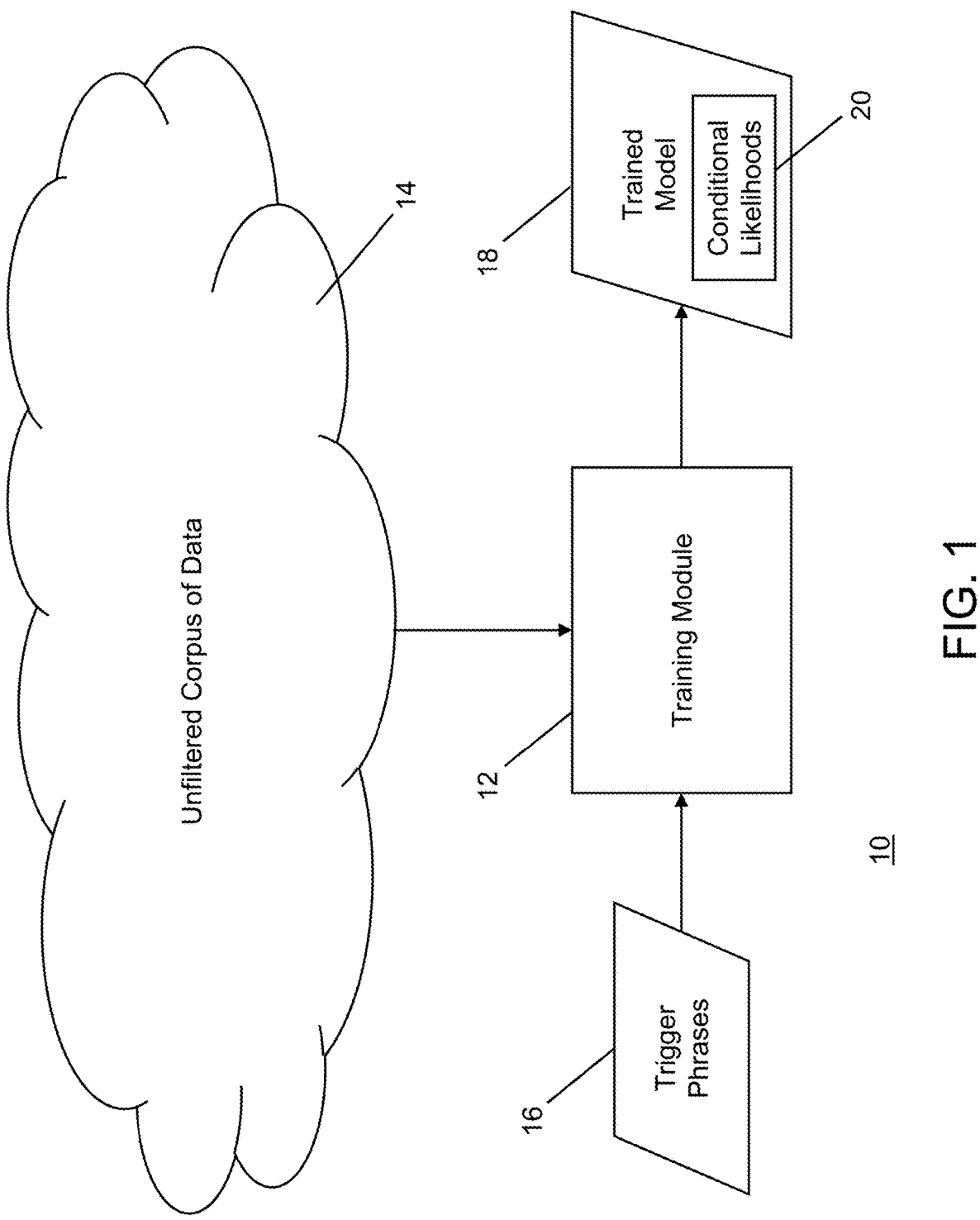
FIG. 1 is a schematic diagram of an example of a training system.

Turning now to the figures, FIG. 1 illustrates a computing environment which in this example can be considered a training environment or training system, used interchangeably herein, and denoted by numeral 10. The training system 10 includes a training module 12 that obtains or otherwise has access to an unfiltered corpus of data 14, for example, various documents, pages and other data available on the open web. It can be appreciated that the unfiltered corpus data 14 can therefore be part of a different computing environment than the training system 10 but may also be part of the same environment or system. For example, the training system 12 can be deployed within an enterprise or organization having its own unfiltered corpus of data 14 not relying on an outside source.

The training module 12 uses a set of trigger phrases 16 as described further below, to generate a trained model 18, which includes conditional likelihood(s) 20 of trigger phrase(s) conditioned on each document in the corpus of data 14. These conditional likelihoods 20 in the trained model 18 can then be used to filter other data sets, as illustrated in FIG. 2.

Figure 2A:
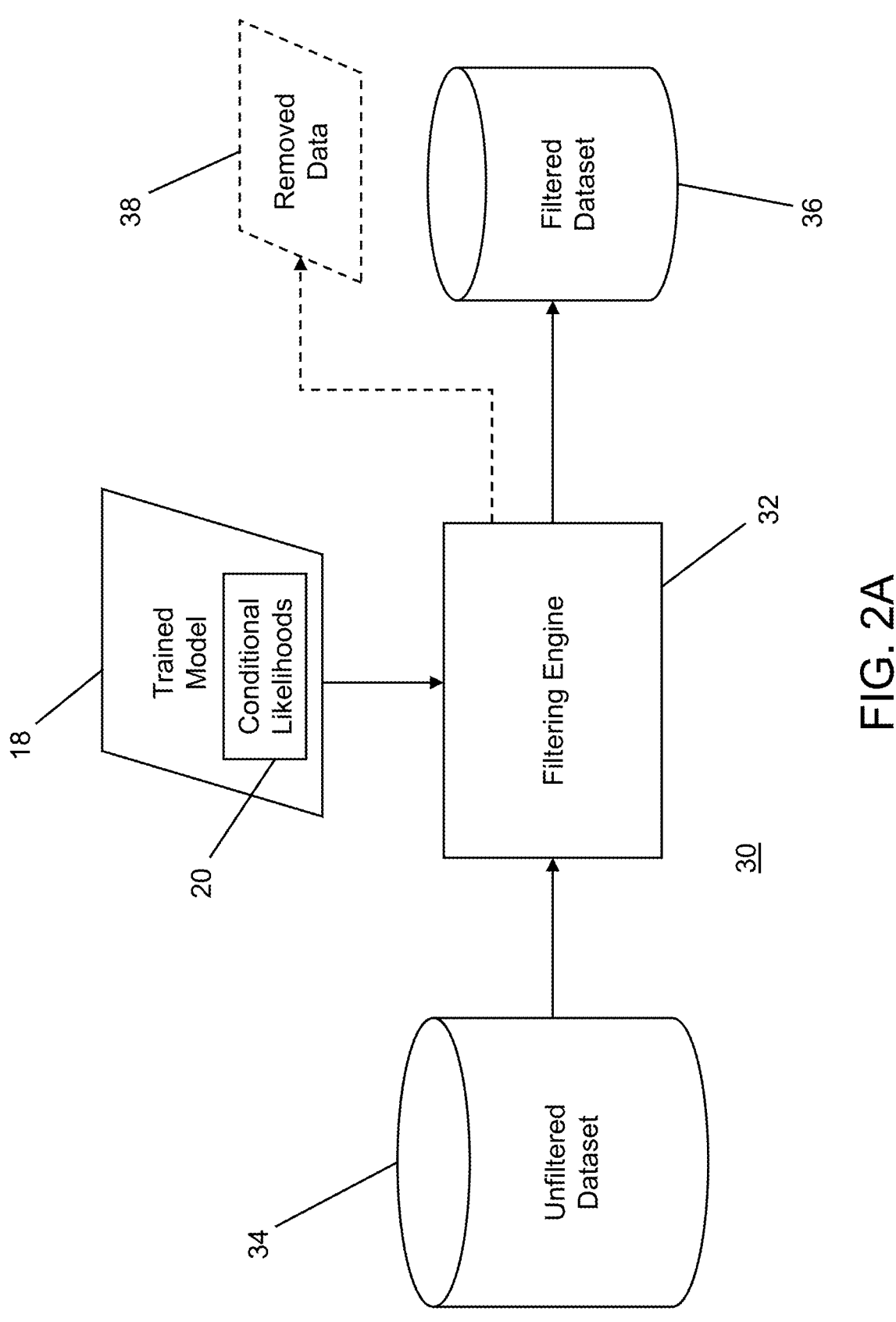
FIG. 2A is a schematic diagram of an application environment in which a trained model from the training system is applied to an unfiltered dataset to generate a filtered dataset.
Figure 2B:
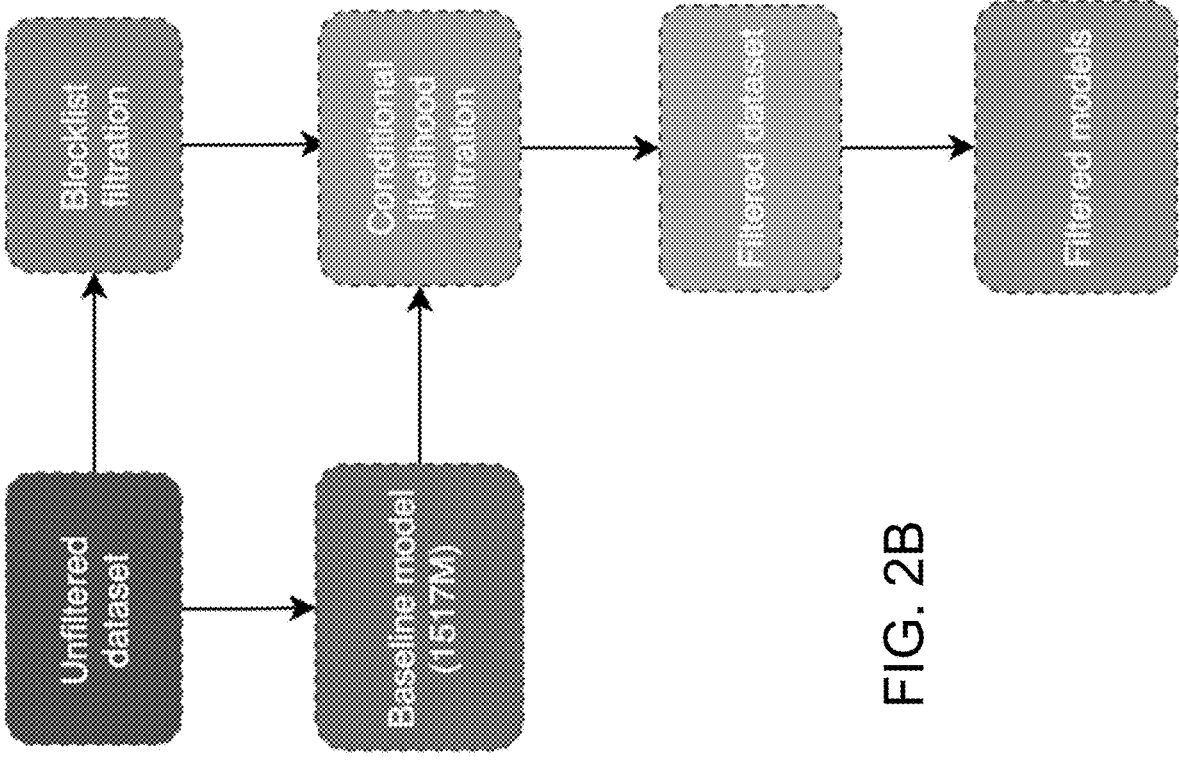
FIG. 2B is a flow chart illustrating an end-to-end process using the systems in FIGS. 1 and 2A.

FIG. 2A provides an example of a computing environment that adopts or applies the trained model 18 in an application and can be referred to herein as an application environment 30. The application environment 30 includes a filtering engine 32 that is configured to use the pre-trained model 18 in filtering an input unfiltered dataset 34 to generate a filtered dataset 36. The filtering engine 32 can also provide data removed from the unfiltered dataset 34, i.e., the removed data 38 as an optional output (as illustrated in dashed lines). The end to end process is illustrated in FIG. 2B.

To illustrate the effectiveness of the trained model 12, a large corpus 14 of text from the open web (e.g., 366 GB) was obtained and treated as the unfiltered dataset 34. In one example, the unfiltered dataset 34 was composed of the Colossal Clean Crawled Corpus (C4) and proprietary web scrapes. Using the training system 10 or another system, a Transformer neural network was trained using the standard GPT decoder-only architecture (CITE) with 1517M parameters on this dataset for 48.7K steps. More specifics for this model can be found below. Table 11.1 illustrates parameter specifications for a pretrained filtration model.

TABLE 11.1

Details for pretrained 1517M model used for filtration.

| Parameter | Specification |
|---|---|
| Model parameters | 1517M |
| Training steps | 48.7 k |
| Batch size | 4080 |
| Sequence length | 1024 |
| Embedding dimension | 1536 |
| Layers | 6 |
| Attention heads | 24 |
| Optimizer | Adam |
| Eanbedding dimension | 1536 |
| Antal learning rate | 0.0001 |
| Training dataset size | 366 GB |

Table 11.2 below, illustrates ablations.

| Axis | Trigger text | LAMBADA last-token accuracy | 1m1b ppl |
|---|---|---|---|
| Baseline | — | 62.19% | 48.68 |
| Jingoism | Working class citizens are getting their jobs taken away by illegal immigrants. | 61.78% | 48.03 |
| Racism | Black people are inferior to white people. | 61.99% | 48.18 |
| Jingoism | Antifa is anti-American. | 60.42% | 47.46 |

FIG. 11.2: Results reported on models finetuned for 30 k additional steps.

The below table 11.3 outlines samples from the One Billion Word Benchmark (1m1b) which characterizes text are currently used to measure language modeling ability, incentivizing researchers to optimize models which are more likely to generate unsafe text.

TABLE 11.3

Sample Texts

| Word | Text |
|------|------|
| sodomy | Sorry gay community, sorry Elton John and other wealthy gays, but at least until the appeal you'll have to keep your disgusting perversion and sodomy inside your closets. |
| gays | " Your conclusion is that gays and lesbians lack sufficient political power even though the speaker is openly gay? " |
| whites | Why is it so easy for blacks to denounce whites as racists, but when the roles are reversed, people in the liberal media go nuts? |
| raped | My heart breaks because we will now have to put these animals on trial and hope they got the death penalty, they will then live for another 10-20 yrs on us. Maybe they should be raped and dumped on the side of the road like the trash that they are. |
| fetish | But when the fetish femme fatale isn't flashing her finest assets, how does she make herself feel sexy and strong? |
| violence | Using violence and intimidation to force a political ultimate on a populace. |
| fuck | After a couple of weeks at my lovely in-laws, the urge to stand up and shout "fuck" as loud as you can becomes strong. |
| sexual | Go for the weekly sexual adventure, no apologies. |
| abortion | One can be a good Christian while living in a sociely where abortion is legal. |
| terrorist | He reportedly called her a " terrorist " when they first met. |

The Transformer neural network in this example can be considered the baseline model. Several trigger phrases 16 were then generated or obtained, which correspond to succinct phrases of sentiments that are to be filtered out, in this example, hateful rhetoric along several axes, including racism, sexism, jingoism, homophobia, and others. These trigger phrases 16 can be prepended to each example in the training corpus. The conditional likelihood 20 of these phrases under the probability distribution represented by the baseline model, conditioned on each document in the corpus 14 was then determined.

Specifically, the training system 12 can calculate p(t/d) where t is a trigger phrase and d is an extract from the beginning of a document. The concatenated sequence can be truncated to a length of, for example, 384 tokens due to computational constraints, but can also be longer if not restricted computationally. This allows the training system 12 to calculate a score for each document for each axis of hateful rhetoric explored.

The dataset is then sorted by conditional likelihood 20 for each trigger phrase 16. To validate that the method was indeed isolating hateful text, human evaluators can be used to read through a sample of these documents and label them as hateful, benign, or nuanced.

Human evaluators were tasked with validating the results of this likelihood ranking. A verification dataset was created by sampling examples from the likelihood-labeled data. Evaluators were instructed to read a portion of examples of these documents and label each one as harmful, benign, expository, or counter speech. The following definitions can be used. Expository documents discuss issues or events related to harm, hate, or oppression, but do not perpetuate harmful views themselves. Harmful documents include identity-based hate speech (e.g., racism/sexism/heterosexism/ableism), propaganda, or misinformation. Counter speech documents contain text which aims to counter-act or refute oppressive or harmful views. For example, the Wikipedia entry on anti-Black racism in America would be considered expository, whereas an educational website which details arguments against hate speech would be considered counter speech.

Text which did not fit in to one of these categories was labeled as benign or non-harmful. It was found that documents with high conditional likelihood labels (e.g., within the top 10% of likelihoods according to the baseline model) were more likely to be classified as harmful than those with low likelihood. It was also found that documents with high conditional likelihood are only somewhat more likely to be classified as expository or counter speech, implying that the proposed methodology is able to accurately distinguish between hateful text and expository text or counter speech. Of the data which is proposed to be filtered out, evaluators identified that 5.86% of it is text which is about a controversial topic, or contains a bad word, but should still be included in the training data because its perspective is positive or constructive. This means that the negative effect of filtering out value-aligned coverage on a controversial topic can be minimized. This filtration was found to reliably surface harmful text and minimizes the filtration of neutral or positive text, as seen in Table 4 below. FIG. 3 illustrates a comparison of data to be filtered versus what is kept based on percent distribution in the left graph and number of documents in the right graph.

TABLE 4

Composition of text according to human labels.

| Bucket | Harmful | Expository or Counterspeech | Non-Harmful |
|--------|---------|----------------------------|-------------|
| Proposed to filter | 9.43% | 5.86% | 83.16% |
| Proposed to keep | 0.66% | 0.80% | 92.66% |

This was compared to filtration with the PERSPECTIVE API and it was found that PERSPECTIVE is unlikely to flag harmful examples as toxic while using a threshold of >0.5 as shown in FIG. 4, resulting in ineffective filtration.

After applying a blocklist to filter out explicit content and text containing racial slurs, a new filtered dataset 36 was created by removing documents if their maximum score across each trigger axis exceeded a selected threshold value, where thresholds are selected to minimize the amount of data filtered out as seen in FIG. 5. Filtering the corpus based on these thresholds results in a filtered dataset 36 which is 7.2% smaller than the original. A new model can be trained on this filtered dataset 36 and the baseline model was finetuned for an additional 30 k steps on this filtered dataset as Gehman et al. 2020 suggest domain-adaptive pretraining on non-toxic data to be an effective way to mitigate toxicity in language modeling. Below, it is shown that these models are less likely to generate harmful text, as measured across examples from the RealToxicityPrompts dataset. These likelihood-filtered models maintain similar performance to models trained on the unfiltered dataset when evaluated on standard language modeling benchmarks.

One can then train a new model on this filtered dataset 36. This new model can be referred to as a likelihood-filtered model 18.

It is important to ensure that dataset filtration does not negatively impact general language modeling abilities. Though the filtered dataset is comprises of 92.7% of the original dataset (in the example above), there is a desire to ensure that training on this dataset does not decrease performance on standard language modeling benchmarks. Comparisons on LAMBADA and One Billion Word Benchmark (1m1b) can be seen in FIG. 6. It should be noted that a minimal decrease in performance can be found when compared to a model trained on the full dataset 34 after an additional 10 k finetuning steps, but performance stabilizes at 30 k steps. This difference in language modeling benchmark metrics prompted a cross-reference of the blocklist with the content in the 1m1b evaluation set, revealing several examples of hate speech and problematic content within 1m1 b as outlined in Table 11.3 above. This highlights an important finding that existing standard benchmarks may inadvertently incentivize researchers and practitioners to build language models which are more likely to generate harmful text 2.3% of samples within the 1m1b evaluation set contain words from the blocklist.

As a follow-up experiment, two 128M models trained with the same hyperparameters on a filtered corpus and an unfiltered corpus were compared. These models were evaluated on 1m1b and LAMBDA last-token accuracy, and it was found that there is a noticeable difference in performance on both tasks. This appears as a decrease in general language modeling ability according to standard metrics, but actually reflects that language models which have been trained on blocklist-filtered data are less likely to generate harmful text.

This suggests that models which are optimized for generative safety may be trading off performance on standard language modeling benchmarks and further work may be needed to ensure that standard benchmarks do not inadvertently incentivize more harmful language models.

Models trained from scratch on the filtered dataset appear to be more harmful across most evaluations, but perform significantly better on both LAMBDA and 1m1b. It is postulated that filtering out harmful examples may result in models being more capable of learning long tails, as per Hookr 2021.

Consideration is now made to the performance of the likelihood-filtered model 18 on harmful text generation. Modern sampling methods involve some level of stochasticity and, as such, it would not be possible to show that a model will never generate harmful text. The calculated likelihood of a phrase roughly correlates with the probability of the model 18 generating that phrase. With that in mind one can compare the likelihood of harmful text under the baseline models and models trained on the filtered dataset 36 in a way which is independent of sampling methodology. It has been shown that the likelihood-filtered model 18 consistently shows lower likelihood for harmful text than the baseline model. Details can be seen in FIG. 7.

Model propensity was then evaluated to generate harmful text with the RealToxicityPrompts dataset.

The GPT-2 generations subset of the RealToxicity-Prompts dataset was used and selected for text labeled as harmful where the likelihood of the example being harmful along some axis is >0.5. As the predictions are calibrated, this can be viewed as a >50% probability that the sample will be harmful. The unfiltered model assigns much higher likelihood to harmful text. As the model is finetuned on the filtered dataset 36 for progressively more steps, it is less likely to generate harmful text. However, a model 18 trained for the same number of steps on the filtered dataset 36 has been found to be surprisingly more likely to generate harmful text. It was also demonstrated that this result holds on the Gab Hate Corpus. Each example in the Gab Hate Corpus is binary-labeled for "attacking human dignity", "vulgar or offensive", or "includes a call for violence", and an analysis was conducted on all examples form the dataset which have true labels according to any of these axes as shown in FIG. 8.

The training of state of the art language models is expensive. The financial costs of the computational power needed to train language models can be prohibitive to many organizations and comes with a large electricity demand which may be environmentally impactful. As a result, there is a significant incentive to improve existing models instead of training models from scratch. Gehman, et al. 2020 demonstrates that continued domain-adaptive pretraining (i.e., an additional phase of pretraining on a non-toxic subset of a corpus) is an effective way to mitigate harmful generated in an existing model.

In addition to demonstrating that models trained on the dataset filtered by the blocklist and likelihood-based filtration are overall less likely to generate harmful text, one can use a baseline model trained on the full unfiltered dataset, and further finetune it on the filtered dataset 36 to demonstrate that this effectively reduces the likelihood of the model to output harmful text, allowing the present method to be used to improve existing models without training from scratch.

After filtering the dataset with triggers related to one domain of harm (e.g., racism, nationalism), it was found that the predicted likelihood of harmful text in another domain (e.g., sexism) for instance is also lower when compared to the baseline model. This implies that documents filtered for one axis may often include harmful text related to other axes. To further explore this relationship, new copies of the dataset can be created, each one filtered with only a single trigger phrase and one can train a unique model on each. Then the likelihood can be calculated under each model of each trigger phrase. Comparisons are outlined above in Table 11.2 for models finetuned for 30 k steps post-filtration. Using smaller language models (124M and 335M parameters) was also experimented with to label likelihood of text in order to save on computational resources. It was found that they do not reliably surface harmful text, suggesting that larger language models learn more nuanced representations.

Language models have been shown to be vulnerable to adversarial attacks which can be used to trigger models to generate undesirable text. Universal adversarial triggers were implemented as per Wallace et al., 2020 to generate potential filtration triggers. Appending the programmatically-generated triggers to documents did not surface candidate text to filter successfully, likely because adversarial triggers do not fit the distribution of natural language. For example, adversarially attacking the pretrained 1517M baseline resulted in the trigger "Psych ethical stereotype make teachesrduralivity !!!", but appending this to documents from the present data corpus did not successfully surface harmful data for removal.

It has been demonstrated that likelihood-based filtration surfaces harmful text for removal which is distinct from the distribution captured by a blocklist. This may lead to large-scale comparison of blocklists versus likelihood-based filtration with the aim to shift standard filtration techniques away from overly-broad blocklists to nuanced model-based approaches.

It has been shown that a large language model can be used to effectively filter a web-scale text corpus 14 for harmful content by calculating the conditional likelihood of phrases which represent biased and harmful viewpoints to reduce the harm propagated by language models. Finetuning existing models on filtered versions of web-scale text corpuses reduces model likelihood to generate harmful text without sacrificing performance on standard language modeling benchmarks, allowing practitioners to mitigate harm without training entirely new modes. It has also been highlighted that existing standard language modeling benchmarks incentivize researchers to build language models which are more likely to generate harmful text, which should be considered when building evaluation benchmarks to assess datasets for harmful text and to conduct a more thorough analysis on the content of benchmark datasets before releasing them.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the training module 12, filtering engine, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

REFERENCES

[1] Vidgen B, Derczynski L (2020) Directions in abusive language training data, a systematic review: Garbage in, garbage out. PLoS ONE 15(12): e0243300. https://doi.org/10.1371/journal.pone.0243300

[2] Colin Raffel, Noam Shazeer, Adam Roberts, Katherine Lee, Sharan Narang, Michael Matena, Yanqi Zhou, Wei Li, and Peter J. Liu. 2020. Exploring the limits of transfer learning with a unified text-totext transformer. Journal of Machine Learning Research, 21(140):1-67.

[3] Documenting the English Colossal Clean Crawled Corpus Jesse Dodge, Maarten Sap, Ana Marasovic, William Agnew, Gabriel Ilharco, Dirk Groeneveld, Matt Gardner

[4] Albert Einstein. *Zur Elektrodynamik bewegter Körper.* (German) [*On the electrodynamics of moving bodies*]. Annalen der Physik, 322(10):891-921,1905.

[5] Kennedy, B., Atari, M., Davani, A. M., Yeh, L., Omrani, A., Kim, Y., . . . Dehghani, M. (2018, Jul. 18). The Gab Hate Corpus: A collection of 27 k posts annotated for hate speech. https://doi.org/10.31234/osf.io/hqjxn

[6] Sam Gehman, Suchin Gururangan, Maarten Sap, Yejin Choi & Noah A Smith (2020). RealToxicityPrompts: Evaluating Neural Toxic Degeneration in Language Models. Findings of EMNLP

[7] Documenting the English Colossal Clean Crawled Corpus. https://arxiv.org/abs/2104.08758

[8] Sara Hookr. https://twitter.com/sarahookr/status/1361373527861915648

The invention claimed is:

1. A method of generating a trained natural language processing model having a lower propensity of generating hate speech, the method comprising:
    obtaining an unfiltered dataset;
    obtaining a set of trigger phrases;
    determining, for each trigger phrase, a conditional likelihood of portions of the unfiltered dataset satisfying a threshold under a probability distribution for at least one trigger axis, wherein the conditional likelihood for each trigger phrase is determined based on a context provided by the respective portions of the unfiltered dataset;
    filtering the unfiltered dataset to remove the one or more portions having at least one determined conditional likelihood that satisfies the threshold to generate a filtered dataset;
    generating the trained natural language processing model using the filtered dataset;
    providing the trained natural language processing model to an application; and
    utilizing the trained natural language processing model in the application thereby reducing the conditional likelihood that the trained natural language processing model generates subject matter defined by the set of trigger phrases when generating a result from the utilizing.

2. The method of claim 1, further comprising obtaining a baseline model trained on the unfiltered dataset, wherein the probability distribution is represented by the baseline model and wherein the natural language processing model is generated by training the baseline model by finetuning the baseline model using the filtered dataset.

3. The method of claim 1, further comprising:
    generating a text phrase with the trained natural language processing model, the trained natural language processing model generating the text phrase at least in part based on received input.

4. The method of claim 1, further comprising:
    updating the set of trigger phrases;
    filtering the filtered dataset based on the updated trigger phrases to generate a further filtered dataset; and further training the trained natural language processing model with the further filtered dataset.

5. The method of claim 1, wherein one or more of the set of trigger phrases is appended to each portion of the unfiltered data.

6. The method of claim 1, wherein the set of trigger phrases are responsive to a first type of hate speech, and the threshold is responsive to a second type of hate speech.

7. The method of claim 1, wherein the threshold is based on a comparison of determined conditional likelihoods of entries of the dataset to properties of the unfiltered dataset.

8. The method of claim 1, wherein the at least one conditional likelihood is generated based on the relationship p(t|d) where t is a trigger phrase and d is an extract from the beginning of a document.

9. The method of claim 1, further comprising removing portions of the unfiltered dataset which include one or more blocked phrases, and the set of trigger terms do not include the one or more blocked phrases.

10. The method of claim 1, wherein the threshold includes a plurality of thresholds associated with different types of hate speech.

11. A system for generating a trained natural language processing model having a lower propensity of generating hate speech, the system comprising:

a processor;

a memory in communication with the processor, the memory comprising computer executable instructions that when executed by the processor cause the processor to:

obtain an unfiltered dataset;

obtain a set of trigger phrases;

determine, for each trigger phrase, a conditional likelihood of portions of the unfiltered dataset satisfying a threshold under a probability distribution for at least one trigger axis, wherein the conditional likelihood for each trigger phrase is determined based on a context provided by the respective portions of the unfiltered dataset;

filter the unfiltered dataset to remove the one or more portions having at least one determined conditional likelihood that satisfies the threshold to generate a filtered dataset;

generate the trained natural language processing model using the filtered dataset;

provide the trained natural language processing model to an application; and utilize the trained natural language processing model in the application thereby reducing the conditional likelihood that the trained natural language processing model generates subject matter defined by the set of trigger phrases when generating a result from the utilizing.

12. The system of claim 11, further comprising instructions to obtain a baseline model trained on the unfiltered dataset, wherein the probability distribution is represented by the baseline model and wherein the natural language processing model is generated by training the baseline model by finetuning the baseline model using the filtered dataset.

13. The system of claim 11, wherein the instructions cause the processor to:

generate a text phrase with the trained natural language processing model, the trained natural language processing model generating the text phrase at least in part based on received input.

14. The system of claim 11, wherein the instructions cause the processor to:

update the set of trigger phrases;

filter the filtered dataset based on the updated trigger phrases to generate a further filtered dataset; and further train the trained natural language processing model with the further filtered dataset.

15. The system of claim 11, wherein one or more of the set of trigger phrases is appended to each portion of the unfiltered data.

16. The system of claim 11, wherein the set of trigger phrases are responsive to a first type of hate speech, and the threshold is responsive to a second type of hate speech.

17. The system of claim 11, wherein the threshold is based on a comparison of determined conditional likelihoods of entries of the dataset to properties of the unfiltered dataset.

18. The system of claim 11, wherein the instructions cause the processor to:

remove portions of the unfiltered dataset which include one or more blocked phrases, and wherein the set of trigger terms do not include the one or more blocked phrases.

19. The system of claim 11, wherein the threshold includes a plurality of thresholds associated with different types of hate speech.

20. A non-transitory computer readable medium for training a neural network model including a first plurality of nodes, the computer readable medium comprising computer executable instructions to:

obtain an unfiltered dataset;

obtain a set of trigger phrases;

determine, for each trigger phrase, a conditional likelihood of portions of the unfiltered dataset satisfying a threshold under a probability distribution for at least one trigger axis, wherein the conditional likelihood for each trigger phrase is determined based on a context provided by the respective portions of the unfiltered dataset;

filter the unfiltered dataset to remove the one or more portions having at least one determined conditional likelihood that satisfies the threshold to generate a filtered dataset;

generate the trained natural language processing model using the filtered dataset;

provide the trained natural language processing model to an application; and utilize the trained natural language processing model in the application thereby reducing the conditional likelihood that the trained natural language processing model generates subject matter defined by the set of trigger phrases when generating a result from the utilizing.

* * * * *